United States Patent Office 3,456,401
Patented July 22, 1969

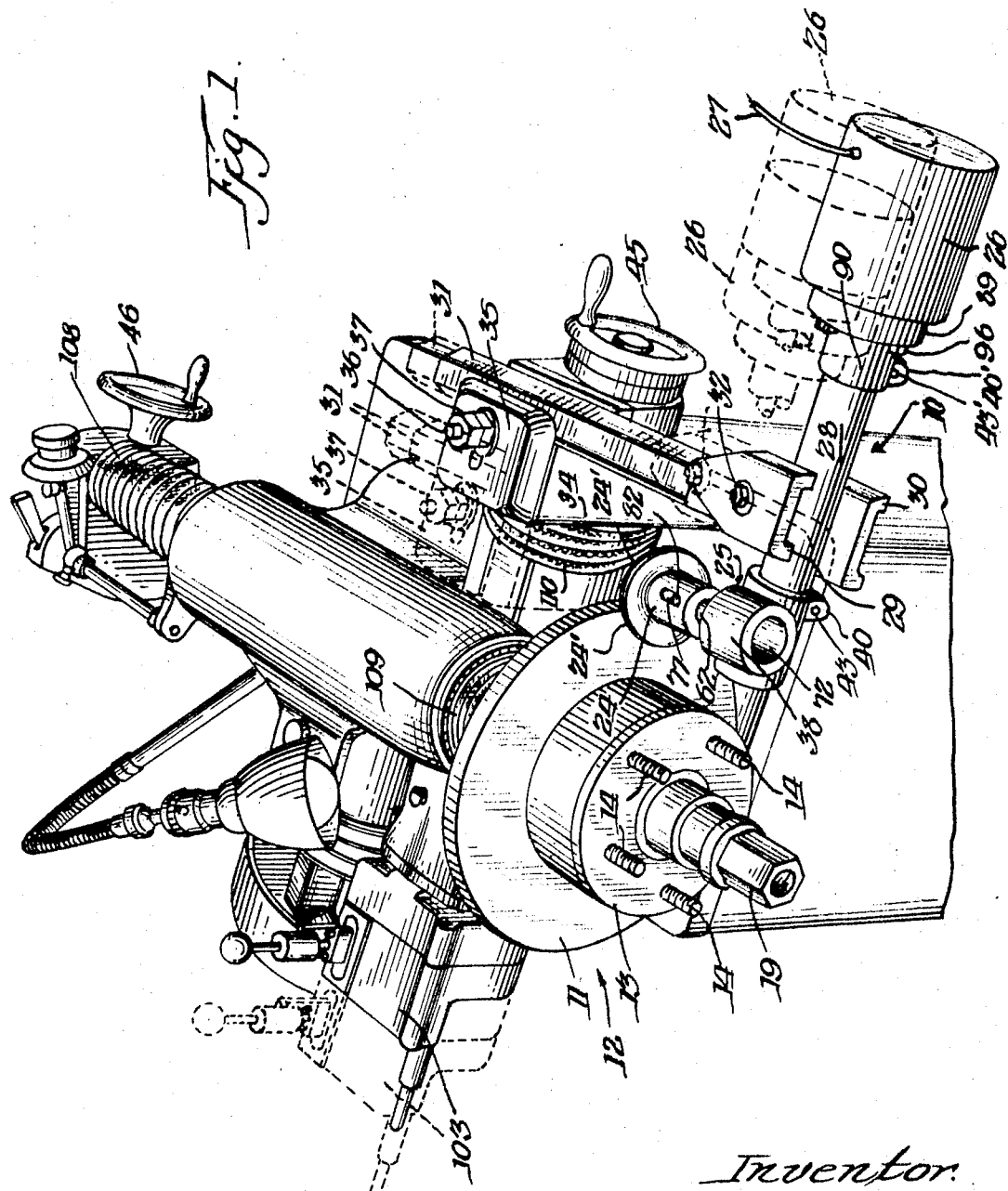

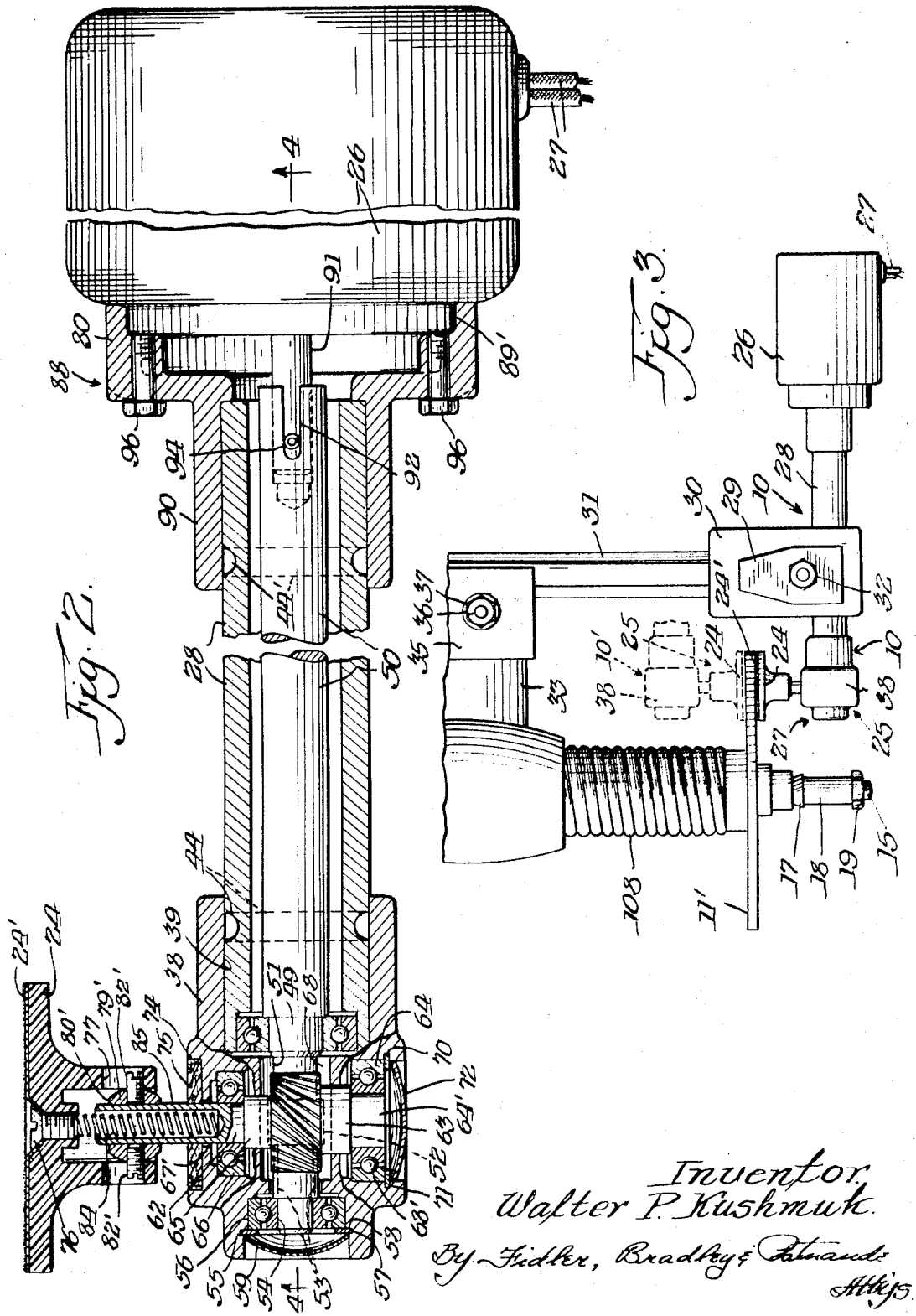

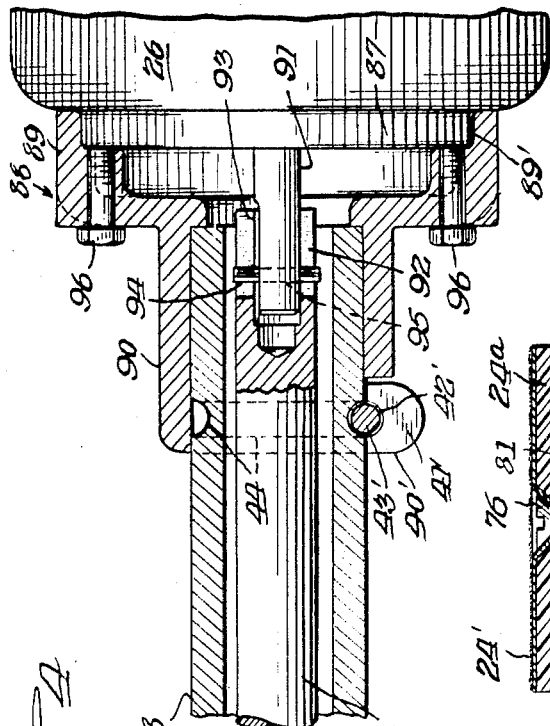

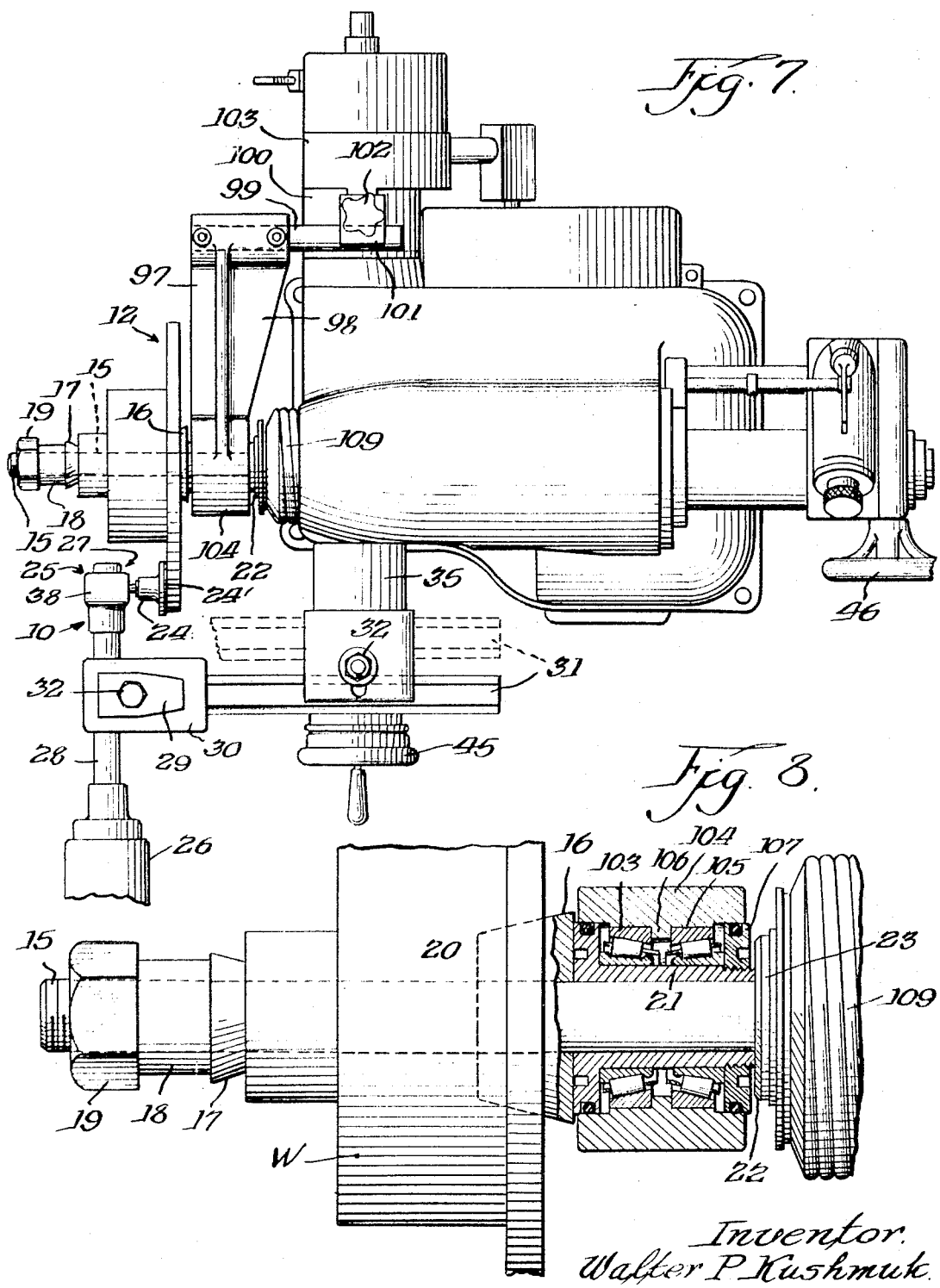

3,456,401
BRAKE DISC GRINDER
Walter P. Kushmuk, Niles, Ill., assignor to Ammco Tools, Inc., North Chicago, Ill., a corporation of Illinois
Filed Aug. 30, 1965, Ser. No. 483,747
Int. Cl. B24b 19/26
U.S. Cl. 51—259                                9 Claims

ABSTRACT OF THE DISCLOSURE

A brake disc grinder includes a right angle head having a spindle upon which is detachably assembled a floating universal unit and an abrasive-disc for surface grinding the face of a brake disc. A motor causes the floating unit and abrasive-disc to rotate in the same direction as the direction of rotation of the brake disc, thereby providing the brake disc with a swirled finish.

---

The present invention relates to a grinding device and more particularly to a brake disc grinder for grinding the braking surface of disc brake rotors after the brake discs have been machined and is especially well adapated to obtain the perfect parallelism required in brake discs.

The brake disc grinder of the present invention is particularly well adapted for use as an attachment for lathes of the type disclosed and claimed in the United States Letters Patent to Billeter 2,891,435 granted June 23, 1959, and in lathes of the type as disclosed in applicant's copending application Ser. No. 283,886 filed May 28, 1963 now Patent 3,245,292 issued on Apr. 12, 1966, and copending application Ser. No. 283,938 filed May 28, 1963, now abandoned. These devices are particularly well adapted for turning brake drums and facing disc brakes and furthermore are also very well adapted for grinding automotive brake drums and brake discs.

Prior to this invention, after brake discs had been turned using the lathe of any one of the aforementioned applications, a grinding attachment was installed in the clamp used for the facing bar assembly and a dresser clamped to the brake disc with the diamond on the side which was to be ground. The diamond height was set so it was on the center of the grinding wheel and the wheel was dressed until completely trued. With the earlier form of brake disc grinder in order to obtain perfect parallelism as required in brake discs, it was preferred to perform machining and grinding without moving the disc relative to the arbor of the lathe.

Although the brake disc grinder of this invention is preferably used in maintenance and servicing of brake discs, the brake disc grinder is equally adapted for production of brake disc rotors after the machining thereof in lathes of the aforementioned type or other forms of production lathes in order to provide perfect parallelism required in brake discs.

Therefore, an object of the present invention is to provide a disc brake grinder for grinding disc brake rotors to a desired finish without the need of a high degree of skill as required by the usual grinding techniques.

Another object of the invention is to provide a grinding device utilizing a floating universal disc and abrasive-disc which will enable it to contact the disc brake rotor without the need of critical alignment of the unit with the brake disc rotor operatively mounted on the arbor of a lathe of the type of the aforementioned patent and applications after the brake disc rotor first had been properly turned and trued.

Still another object of the invention is to provide a brake disc grinder to provide a surface finish of the desired quality after a brake disc rotor has been accurately machined with a tool bit in order to obtain perfect parallelism as required in brake discs.

A further object of the invention is to utilize the brake disc grinder of this invention with a lathe of the aforementioned type which is adapted for not only machining a brake disc when using a conventional disc brake attachment but also wherein the brake disc grinder attachment will be mounted upon the tool holder operatively mounted on the cross-feed of the lathe, the brake disc grinder attachment being substituted and replacing the facing bar for facing and/or machining brake discs.

Another object of the invention is to grind the faces of the brake disc with its hub installed.

Still another object of the invention is to provide the brake disc grinder with a right-angle head so that the floating universal disc and abrasive-disc may contact the disc brake rotor without the need of critical alignment of the brake disc grinder on the tool bar mounted on the cross-feed of the lathe.

A particular feature of the invention is the provision of a brake disc grinder having a right angle-head including a spindle upon which is detachably assembled a floating universal disc unit and an abrasive-disc and driven from a pinion gear operatively engaging the helical gear, the pinion gear operatively mounted on a motor shaft connected to an electric motor, the right angle head and the motor being detachably assembled upon a tubular housing for adjustably mounting in the tool holder of a lathe of the type adapted for machining brake drums and brake discs with a lathe of this type including a cross-feed set for disc brake facing. A cross-feed means and/or attachment of this type for disc brake facing and grinding provides positive spindle lock to assure square and flat disc faces and the cross-feed means and/or attachment also includes a cross-feed drive mechanism, spindle support arm and a twin cutter boring bar which is substituted in grinding the brake disc by the disc brake grinder of this invention.

Other objects and features of the invention are to provide an apparatus of the character as outlined above which is simple in construction and is provided with a minimum number of moving parts and therefore, unlikely to become out of order; rugged and durable; may be manufactured at a comparatively low cost; utilizing conventional parts such as a "Delrin" disc, abrasive disc, ball bearings, "Welch" plugs or closures for the gear reduction head and having its abrasive element so arranged that it may be readily and simply removed and replaced.

Other objects and advantages of the invention will be apparent from the following description taken in connection with the drawings wherein:

FIGURE 1, is a perspective view of the lathe illustrating the disc brake grinder in accordance with the invention detachably mounted on the tool holder of the cross-feed mechanism of the lathe;

FIGURE 2, is a plan view partly in cross-section of a brake disc grinder of this invention;

FIGURE 3, is a plan view of the brake disc grinder illustrating schematically a modified form of arbor of the lathe having a protective boot mounted thereon, and illustrating the brake disc grinder detachably mounted upon the tool holder of the lathe with a brake disc grinder set for grinding one face of a brake disc;

FIGURE 4, is a cross-sectional view, partly in elevation, taken along line 4—4 of FIG. 2, looking in the direction of the arrows, illustrating the gear housing and the adjustable mounting to the inner end of the tubular support means and also the detachable housing for detachably mounting an end mounted motor for rotating the floating universal disc and abrasive-disc of the brake disc grinder; and/or brake disc polisher.

FIGURE 5, is an enlarged view of the gear housing of the brake disc grinder partly in cross-section taken along line 4—4, looking in the direction of the arrows and illustrating the "Delrin" disc detachably mounted on the spindle thereof;

FIGURE 6 is an enlarged view partly in cross-section of the gear housing and spindle thereof each with the "Delrin" disc having a modified construction detachably mounted on the spindle;

FIGURE 7 is a top plan view illustrating the disc grinder detachably mounted on the cross-feed attachment of a modified form of the brake drum lathe of FIG. 1, illustrating a brake disc mounted on the arbor of the lathe in position for grinding the surfaces thereof; and FIGURE 8 is an enlarged elevational view partly in section showing a brake disc to be ground on the spindle lock support means of the lathe.

Referring to FIG. 1, there is illustrated a brake disc grinder 10 for grinding a brake disc 11, of a brake disc rotor 12, and which comprises the brake disc 11, a wheel hub 13 and wheel bolts 14 for mounting a wheel and tire assembly (not shown). It is to be understood that the brake disc grinder of this invention is equally adapted for the grinding of the disc of the brake disc whether front or rear. In the use of the brake disc grinder of this invention, the hub and disc is preferably serviced as an assembly.

The brake disc rotor 12 of which the brake disc 11 thereof is to be ground utilizing the brake disc grinder of this invention is mounted on an arbor 15, FIG. 8, by a member having a conical counter surface 16 for engaging the bore in the work piece 12, a second member 17 having a conical surface adapted to engage the other end of the bore of the work piece which in this instance may be in the form of a front wheel brake disc. A spacer 18 and a nut 19 is assembled and screwed on the threaded end of the arbor 15. The assembly consisting of the nut 19, spacer 18, second member and/or conical member 17, work piece W in the form of the brake disc rotor 12, first member and/or conical member 16 is held in tight contact and the member 16 abuts the face with a flange 20 of the sleeve 21. The sleeve 21 turned abuts the shoulder 22 on the adjacent end of the arbor 23 so that the work piece W or brake disc 11 is held firmly on the arbor 15 and against any shifting in a direction parallel to the axis of the arbor.

Referring to FIGS. 1, 2, 3, 4, 5 and 6, a preferred form of disc brake grinder 10 will be described for use with the tool feed attachment of the lathe as disclosed and claimed in applicant's aforementioned copending application Ser. No. 283.886 and the other aforementioned copending application with respect to a particular form of lathe for brake drums and discs. The disc brake grinder 10 includes a "Delrin" disc 24 formed from such material as plastic, synthetic rubber or natural rubber to the shape as illustrated in FIGS. 2, 5 and 6, which is driven through a right angle drive means 25 from an electric motor 26. The motor is preferably a series wound AC motor of ⅓ H.P. 5000 r.p.m. The motor is provided with a suitable cord 27 with a conventional grounded three wire plug (not shown) for detachably mounting in a conventional receptacle. The disc brake grinder 10 is provided with a tubular housing 28 formed preferably of cold drawn steel for axial adjustment transverse to the arbor 15 of the lathe between an upper clamp element 29 and a lower clamp element 30 which also provide mounting of the facing bar (not shown) of the aforesaid lathe.

It is also within the scope of the invention that the tubular housing 28 may be formed from extruded hexagonal tubular stock, either extruded steel or aluminum depending upon the rigidity desired.

The upper and lower clamping elements form part of the six-sided cutter bar 31. It is within the scope of the invention that other shapes of cutter bars may be used. The lower clamping element 30 is provided with a conventional V-shaped groove for detachably mounting not only the facing bar, but also the tubular housing 28 of the brake disc grinder. The upper clamp element 29 is formed with a slot through which is mounted a stud bolt affixed to the lower clamping element 30 and is affixed in adjusted position by a clamping nut 32 for rigidly clamping the tubular housing 28 in its mounted position on the lower clamping element 30.

The mounting means for the cutting tools as well as the brake disc grinder 10 includes a tubular element slidably mounted in aligned bores formed in the frame of the lathe as particularly described in the aforementioned application with respect to the novel cross-feed means for feeding a cutting tool transversely to the axis of the lathe spindle. The tubular element of the aforementioned application has at its outer end a top wall element 33 with an upstanding flange which receives a lower clamping element 34 for adjustably mounting the cutter bar 31. An upper clamping element 35 is provided which is secured in place by a stud bolt 36 and a clamping nut 37. The cutter bar 31 which is six-sided and the flange of the lower clamping member or element 34 are suitably shaped to receive the cutter bar 31 and hold the latter in a fixed position when the upper clamping element 35 is held in its proper position by the clamping nut 37. The clamping nut 37 may be loosened to permit adjustment on the cutter bar 31 in a direction parallel to the axis of the spindle. In the position of the cutter bar as shown in FIG. 1, it is reversed 180 degrees from that of the preferred position of the cutter bar 31 for mounting the facing bar as described with reference to the aforementioned application by reversing 180 degrees the position of the lower clamping element 34 and the corresponding complementally formed upper clamping element 35 to the position as shown in FIG. 1, as compared to that of the dotted position of the cutter bar 31 of FIG. 7.

Referring to FIG. 1, FIG. 4, FIG. 5, and FIG 6, the particular structure of the tubular support means, the right angle arrangement of the right angle drive which makes it convenient to use the brake disc grinder on either side of the brake disc rotor, and the floating construction of the Universal disc will be particularly described. The right angle means 25 permits the "Delrin" disc 24 to be used on either side of the brake disc rotor 11' as shown in the dotted lines of the right angle means 25 of the brake disc grinder 10' as schematically illustrated in FIG. 3. A gear housing 38 is formed with a counter bore 39 for receiving the inner end of the tubular housing 28. If hexagonal tubular material is used for the tubular housing 28, the end thereof would be turned to a diameter complemental to the gear housing. A pinch clamp 40 comprising symmetrically positioned lugs 41, each provided with holes 42 for detachably mounting a securing means 43 in the form of a machine bolt and nut (not shown), the bolt 43" being complementally formed to an annular groove 44 machined on the outer periphery of the tubular housing 28 permitting the gear housing 38 to be rotated about the tubular support means and detachably clamped in any adjusted annular position by the securing means 43. With respect to the use of this brake disc grinder, the gear housing 38 is preferably rotated 180 degrees from the position of the grinder in FIG. 3 to the dotted position thereof for grinding the other machined face of the disc brake. However, when the brake disc grinder is used to grind the opposite face of the brake disc 11' as illustrated in FIG. 3, it is necessary to adjust the cross-feed means of the lathe outwardly to permit the passage of the disc grinder along the outer circumference of the brake disc 11'. After which, the arbor may be adjusted axially longitudinally if there is insufficient room between the brake disc 11' and the lathe, after which the gear housing may be rotated 180 degrees to the dotted position and the cutter bar 31 moved to the right of the lathe so that the brake disc grinder 10 will line up to its grinding position, as shown schematically by the gear housing 38 in dotted lines. It is preferred that as few movements of the brake disc grinder 10 take place in moving from one face of the other to permit the finish grinding of the surface so that the faces on opposite sides of the brake disc will be parallel to each other. It is within the scope of the invention that the brake disc grinder 10 can be rotated 180 degrees by loosening the clamping nut 32 and locked into the position as shown in the dotted lines of FIG. 3, after which the cross-feed is adjusted to move the "Delrin" disc 24 beyond the edge of the brake disc to the dotted position as shown in FIG. 3, and the cross-feed operatively adjusted by rotation of the handle 45 to properly locate the "Delrin" disc 24. The brake disc may then be moved against the "Delrin" disc 24 and its abrasive disc 24' by adjusting the spindle of the lathe by movement of the handle 46. If further adjustment is necessary, the clamping nut 37 may be loosened for releasing the cutter bar 31 within the lower clamping element 34 and upper clamping element 35 to permit longitudinal movement of the cutter bar 31 until the "Delrin" disc 24 and its abrasive disc 24' are properly adjusted against the face of the brake disc 11'.

Referring to FIG. 2 and FIG. 4, the tubular support means 28 is formed with a counter-bore 47 in which is mounted a ball bearing 48 pressed fitted in the counter-bore and to which a reduced end portion 49 of the drive shaft is assembled. The drive shaft 50 in addition to the reduced portion 49 for mounting the ball bearing 47 has a shaft portion 51 of less diameter on which is mounted a motor shaft pinion 52 suitably keyed to the shaft by keys (not shown) mounted in the key ways 53. Referring to FIG. 4, the shaft end 54 operatively mounts a ball pilot bearing 55 to properly assemble the drive means 50 within the gear housing 38. The ball pilot bearing 55 is suitably mounted in a counter bore 56 and detachably positioned by a locking ring 57 received in an annular recess 58 therefor. A "Welch" plug 59 forms a suitable clear closure for access to the bearing 55. It is to be understood that each bearing 48 and 55 may be press fitted on their respective shaft portion keyed thereon. The gear housing 38 is provided with an annular recess 60 to provide clearance for the ball bearing 48. A similarly annular recess 60' is provided in the tubular support means contiguous to the face of the bearing 49 to provide clearance for the rotation of the inner race and to permit proper lubrication of the bearing.

Referring to FIG. 2, FIG. 4, FIG. 5 and FIG. 6, a helical and/or spiral gear 61 is suitably keyed to a spindle 62 on the outer end of which is detachably mounted the "Delrin" disc 24. The end of the spindle and/or shaft 62 opposite the "Delrin" disc 24 has a thrust portion 63 against which the inner race of a ball spindle bearing 64 operatively abuts, the inner race of the bearing 64 being press fitted or suitably keyed to the shaft portion 64' in any conventional manner. The thrust portion 63 operatively abuts a contiguous face of the helical gear 61, as illustrated in FIG. 6. The helical gear 61 is also suitably press fitted or keyed to the gear mounting portion 65 of the spindle shaft 62. At the outer end of the spindle shaft 62, a ball spindle bearing 66 is mounted and the inner race thereof is suitably keyed or press fitted on the outer reduced end 67 and abuts the face of the gear mounting portion 65 as illustrated in FIG. 5. The gear housing 38 is provided with a chamber 68 within which the helical gear 61 is operatively mounted and a counter bore 68' is provided for the spindle bearing 64 and a reduced counter bore 68'' is provided for the other ball spindle bearing 66. The chamber 68' opens to the outer end through which the helical gear 61 and bearings are assembled, and after assembly are held in position by a locking ring 70 complementally formed to an annular groove 71, and the locking ring which is spring biased outwardly into the annular groove 71 permits attachment and detachment thereof for the inspection and replacement of the bearings and helical gear when necessary. A "Welch" plug provides a detachable closure for the helical gear housing portion. The outer reduced portion 67 of the spindle 62 extends through an opening 67' and a counter bore 74 is provided for an oil retaining ring 75 which is press fitted in the counter bore 74.

There has been particularly described a simple gear housing construction for providing a right angle drive for the "Delrin" disc 24 from the drive shaft 50 through the motor shaft pinion 52 and the helical gear 61 which is mounted on the spindle shaft 62 at right angle to the longitudinal axis of the drive shaft 50 and wherein the plane of the axis of the spindle 62 is parallel to the plane of the longitudinal axis of the drive shaft 50. The vertical center-line of the helical gear 61 coinciding with the vertical center-line of the motor shaft pinion 52 and the respective center-lines lying in the same plane and those at right angles thereto lying in a plane perpendicular to the other plane providing a brake disc grinder which in the respective settings thereof on the lathe, grinds the opposite faces of the brake disc when properly set so that they are ground substantially parallel within the limits of accuracy of the lathe and the brake disc grinder.

Referring to FIG. 2, FIG. 5 and FIG. 6, two embodiments of a "Delrin" disc 24 and 24a will be described. The "Delrin" disc 24 of both embodiments is formed as illustrated to have a disc face on which may be suitably cemented an abrasive-disc 24' which is held in place by a machine screw 76 suitably affixed to the "Delrin" disc 24 by a threaded opening complementally formed to the screw threads of the locking screw 76. A slotted opening 77 is formed on the hub 77' of the "Delrin" disc and the disc is provided with a counter bore 78 for receiving a spherical member 79 which is formed with a threaded bore 80 complementally formed to an end 81 of the spindle 62. In the embodiment of FIG. 6, a pin 82 extends through a hole 83 located substantially on the diameter of the spherical member 79 and in alignment with a hole 83' extending through the end 81 of the spindle 62. The arcuate and/or spherical surface of the spherical member 79 together with the pin 82 extending through the slotted opening 77 forms a floating head and/or universal drive for the "Delrin" disc 24 as it is attached to the spindle of the right angle drive of the brake disc grinder.

Referring to the embodiment of FIG. 2 and FIG. 5, a compression spring 84 is axially mounted within a bore 85 with the outer end of the spring abutting the end of the counter bore 78 contiguous to the threaded opening which receives the machine screw. The spring 84 of the embodiment of FIG. 2 and FIG. 5, biases the "Delrin" disc 24 outwardly so that the set screws 82' engage the end of the slot 77 as illustrated. The end 67 of the shaft may be flattened to be engaged by the set screws, and if desirable, the spherical member 79 may have the bore complementally broached to receive the shaft end.

The abrasive-disc 24' may be readily replaced when worn by detaching the screw 76 and recementing a new disc in place. When it is desired to detach the "Delrin" disc 24, the disc may be moved to the left compressing the spring so that the pin 82 or set screws 82' may be readily detached from the sperical member of either embodiment and the opening at the end of the shaft. A new "Delrin" disc or the same disc may be replaced in the reversed order. It is within the scope of the invention that the shaft end and spherical members may be complementally threaded for detachably mounting the "Delrin" disc.

Referring to FIG. 6, there is illustrated a mounting for a "Delrin" disc which is slightly modified from that of FIG. 5. Therefore, the like or similar reference characters will identify the parts thereof. The primary difference is that instead of having a compressing spring 84 mounted in the bore 85, a compression spring 84' abuts the flattened surface of the spherical member 79 and extends over a boss 86 for locating the spring as the spring at the outer end abuts the outer end of the counter bore 78' formed in the cylindrical portion of the "Delrin" disc. The function of this modified form of "Delrin" disc is the same as that of the embodiment of FIG. 5, to provide a floating head and/or universal drive for the "Delrin" disc.

Referring to FIG. 2 and FIG. 4, the end mounted motor 26 formed with an end plate 87 is attached to a support means 88 including a cylindrical portion 89 complementally formed to the end plate 87 having a counter bore 89' complementally formed to receive the end plate 87 of the motor. A tubular portion 90 is integrally formed with the cylindrical portion 89 and complementally formed to detachably receive the outer end of the tubular housing 28. When an hexagonal tubular housing 28 is used, the bore in the tubular portion 90 is sized to receive the hexagonal tubular housing. A pinch clamp 40' similar to that of the gear housing 38 clamps the support means 88 together using the securing means 43' complementally formed to an annular groove 44'. With this form of detachably mounting the motor 26 on to the tubular support means and/or tubular housing 28, the motor 26 may be rotated relative thereto to assist in the location of the cord 27 in respect to its outlet. This may also be accomplished with an hexagonal tubular housing 28. This form of connection also makes it simple to attach the motor shaft 91 to a slotted end opening 92 extending axially with respect to the end of the drive shaft 50 with the end of the drive shaft formed with a counter-bore 93 complementally formed to slidably receive the motor shaft 91 and thus overcomes any misalignment of the motor shaft with respect to the drive shaft. A pin means 94 extends through the slotted end opening 92 and a hole 95 at the end of the motor shaft 91, which in this instance is flattened, normally for a set-screw to be locked thereagainst. This connection permits the motor to be detachably mounted to the drive shaft 50 and the support means 88 is detachably affixed to the end plate 87 of the motor by machine screws 96. After the motor 26 with its support means is detachably mounted on the tubular support means 28, the support means 88 is rigidly secured to the tubular support means by tightening the securing means 43' of the pinch clamp 40'.

With the brake disc grinder construction as described, it is obvious that a simple type of right angle drive for grinding the surfaces of brake discs which may be readily fabricated and assembled. There has also been described a brake disc grinding tool in the servicing thereof, the parts such as the motor may be readily disassembled and the drive shaft 50 and the tubular support means thereof may be also readily disassembled from the gear housing 38. Similarly, the spindle shaft for the "Delrin" disc drive may be readily assembled and disassembled. Likewise, the ball bearings for supporting the drive shaft in the tubular support means may be readily inspected as may the ball bearings for mounting the end of the drive shaft which is assembled in the gear housing and also the bearings for the spindle and the helical gear therefor, may likewise be readily inspected and reassembled. The brake disc grinder as described above permits what may be termed as a "plunge cut" of the face of the brake disc may be taken without distortion of the brake disc or movement of the brake disc grinder from its mounting position on the brake lathe. In the preferred "plunge cut" the "Delrin" disc and its abrasive disc are set against the annular machined face of the brake disc, and the lathe spindle adjusted to the depth of grinding cut desired as the brake disc is rotated.

Under certain conditions it is desirable to machine simultaneously the brake disc surfaces before grinding whether conventional brake discs or the ventilated type disc for air cooling the disc. When two parallel cuts on the brake disc are taken, it may be necessary to provide a support for the arbor on which the brake disc is mounted as illustrated in FIG. 7 and FIG. 8, so that the tool holder may be driven from the main drive of the lathe with the spindle rotated, but not fed in an axial direction. The surfaces are preferred to be ground with the brake disc in the same set up. When the lathe is used in this manner, it is necessary to operate the lathe as disclosed and claimed in applicant's copending application, Ser. No. 283,886. This preferred form of spindle lock used in connection with a twin cutter for the facing operation of the brake disc, assures that the brake disc faces will be parallel and the positive spindle lock 97 assures square and flat disc faces. When the lathe is used in this manner, the feed drive for the spindle is disconnected. The spindle locking means 97 includes an arm 98 carried by a rod 99 which is clamped against the auxiliary feed mechanism housing 100 by an L-shaped clamp 101 secured by a screw 102 threaded into the lead screw nut 103. The arm 98 has a bearing portion 104 through which the arbor 15 extends. Secured in the bearing portion 104 is a pair of oppositely inclined roller bearings 105 separated by an internal flange 106. Journaled in the bearings 105 is a sleeve 21 which has a flange 20 at its outer end which flange serves to retain the adjacent bearing firmly in place. The other end of the sleeve 21 is threaded and receives a closure nut 107 which closes the bearing portion 104 and firmly holds the adjacent bearing 105 against the flange or rib 106. The threaded (right-hand) end of the sleeve 21 is in abutment with a shoulder 22 on the arbor. The work piece and/or brake disc rotor is secured on the arbor of the lathe as particularly described above with reference to FIG. 7 and FIG. 8.

In the use of the lathe of the type of the aforementioned patent and applicant's copending application for grinding brake discs in accordance with the present invention of a brake disc grinder, the work piece after being secured on the arbor, the cutting tools are positioned as described with reference to applicant's aforementioned copending application, Ser. No. 283,886. After both faces of the disc have been properly faced and trued to be parallel, the brake disc grinder 10 is assembled in place on the cutter bar 31 as described with reference to FIG. 1 and FIG. 7. After it has been rigidly clamped in place with respect to one face, a "plunge cut" is taken which grinds the surface of the machined face of the disc. If it is necessary to take another cut, this may be done through a single "plunge cut" for each face is sufficient after the faces of the disc have been accurately machined and there thus provides a surface finish of the desired quality and will also provide the type of swirled finish which is used by certain manufacturers of brake discs. After one side has been properly finished, the right angle arrangement of the brake disc grinder makes it convenient to grind the other face of the brake disc rotor with a similar "plunge cut."

With the "plunge cut" with a brake disc polisher of this type, it is preferred to use a hand feed on the cross-feed of the lathe rather than to position the grinder so the entire surface of the disc brake rotor is ground simultaneously.

It is evident from the foregoing disclosure of the brake disc grinder for use with the aforementioned type of brake drum lathes, that the working parts of the brake disc grinder are readily accessible for inspection and repair, and the nature of the parts and elements is such as to adapt the brake disc grinder attachment for a lathe of this type to simple servicing operations, and converts a conventional brake lathe to an improved grinding machine for grinding the surfaces faces of the brake disc rotors. It is also to be understood where necessary, the gears are suitably heat treated for additional strength and wear, and the mountings for the electric motor and "Delrin" disc are suitably fabricated from steel castings, gray iron or aluminum and malleable iron depending upon the kind of service to which the brake disc grinder is used, and if the shaft and tubular housing are suitably formed from steel which may or may not be heat treated, depends upon the strength desired, and the service to be met in the grinding operation, whether light grinding or heavy duty grinding.

For the purpose of illustration, the invention is also disclosed in connection with protective boots 108 and 109 as illustrated in connection with the lathe of FIG. 1 for the protection of the spindle, lead screw and a protective boot 110 may also be used with the cross-feed support protects against dirt and chips from turning of the brake disc and grinding dust in the grinding of the brake disc. Certain features with respect to the protective boots not claimed herein are disclosed and claimed in applicant's copending U.S. application Ser. No. 474,432 filed July 23, 1965, for Protective Boot for Machine Tool.

"Delrin" as used in the above disclosure is a trademark for an acetal resin and identifies the source of the acetal resin as E. I, du Pont de Nemours and Co., Plastic Dept., Du Pont Bldg., Wilmington, Del.

While there has been described what are at present considered to be the preferred embodiments of the invention, it will be understood that various modifications may be made therein which are within the true spirit and scope of the invention as defined in the appended claims.

I claim:

1. Grinding apparatus for grinding a rotating brake disc comprising:
   a head;
   universal means for mounting the head for universal movement;
   connecting means for slidably connecting said head to said universal means to permit axial movement of said head relative to its axis;
   means for resiliently urging the head with respect to its axis toward the face of the rotating brake disc to be ground;
   disc-abrasive means mounted on the floating head for surface grinding the face of the brake disc; and
   means for causing said head and disc-abrasive means to rotate with respect to the face of the brake disc as the brake disc rotates.

2. Grinding apparatus according to claim 1, wherein said means for causing said head and disc-abrasive means to rotate causes said head and disc-abrasive means to rotate in the same angular direction as the direction of rotation of the brake disc to be ground so that said brake disc is ground with a swirled finish.

3. Grinding apparatus according to claim 1, further including adjustable means for enabling the floating head to be moved in a longitudinal direction relative to the axis of rotation of said disc brake from a position adjacent one face of said disc to another position adjacent the other face of said disc so that said disc-abrasive means can be adjusted to move into contact with either face of the disc brake to be ground.

4. Grinding apparatus according to claim 3, wherein said adjustable means comprises a longitudinally movable member for adjustably moving the floating head in said longitudinal direction, and an adjustably rotatable member rotatably mounted on the longitudinally movable member for enabling said head to be adjustably rotated about the longitudinally movable member so that said disc-abrasive means can be adjustably rotated approximately 180° from a position adjacent one of the faces of said disc to another position adjacent the opposite face.

5. Grinding apparatus according to claim 4, wherein said means for causing said disc-abrasive means to rotate includes a motor, said longitudinally movable member comprising a tubular support means for housing the drive shaft coupled to said motor, and said rotatable member comprising a tubular housing means concentrically mounted on said tubular support means for rotating with respect thereto and clamp means for adjustably clamping said tubular housing in an adjusted position.

6. Grinding apparatus according to claim 5, further including gear means for reducing the speed of the motor to the preferred speed of rotation of the disc-abrasive means for providing a surface finish for the faces of the brake disc being ground.

7. Grinding apparatus according to claim 6, wherein the gear means comprises a helical gear for reducing the speed of the disc-abrasive means operatively connected to a pinion gear at the inner end of the drive shaft, and said helical gear and pinion gear being operatively mounted in said tubular housing means.

8. Grinding apparatus for grinding a rotating brake disc comprising:
   a head;
   means for resiliently urging the head with respect to its axis toward the face of the rotating brake disc to be ground;
   disc-abrasive means mounted on the floating head for surface grinding the face of the brake disc;
   means for causing said head and disc-abrasive means to rotate with respect to the face of the brake disc as the brake disc rotates;
   adjustable means for enabling the floating head to be moved in a longitudinal direction relative to the axis of rotation of said disc brake from a position adjacent one face of said disc to another position adjacent the other face of said disc so that said disc-abrasive means can be adjusted to move into contact with either face of the disc brake to be ground, said adjustable means comprising a longitudinally movable member for adjustably moving the floating head in said longitudinal direction;
   an adjustably rotatable member rotatably mounted on the longitudinally movable member for enabling said head to be adjustably rotated about the longitudinally movable member so that said disc-abrasive means can be adjustably rotated approximately 180° from a position adjacent one of the faces of said disc to another position adjacent the opposite face;
   said means for causing said disc-abrasive means to rotate including a motor, said longitudinally movable member comprising a tubular support means for housing the drive shaft coupled to said motor, said rotatable member comprising a tubular housing means concentrically mounted on said tubular support means for rotating with respect thereto and clamp means for adjustably clamping said tubular housing in an adjusted position;
   gear means for reducing the speed of the motor to the preferred speed of rotation of the disc-abrasive means for providing a surface finish for the faces of the brake disc being ground, the gear means comprising a helical gear for reducing the speed of the disc-abrasive means operatively connected to a pinion gear at the inner end of the drive shaft, said helical gear and pinion gear being operatively mounted in said tubular housing means; and
   a spindle shaft for operatively mounting the floating head at the outer end thereof and positioned at right angles to the drive shaft with the helical gear means operatively engaging the pinion gear providing a right angle drive from the motor to the disc-abrasive means.

9. Grinding apparatus according to claim 8, wherein said resilient means is a compression spring concentrically mounted within the spindle shaft at the end thereof and operatively engaging said disc-abrasive means at the center thereof.

References Cited

UNITED STATES PATENTS

| 1,239,268 | 9/1917 | Hammon | 51—259 X |
|---|---|---|---|
| 2,365,232 | 12/1944 | Wert | 51—170.2 |
| 2,458,472 | 1/1949 | Irwin | 51—259 |
| 2,553,688 | 5/1951 | Thompson | 51—170.2 |
| 2,683,341 | 7/1954 | Kock | 51—259 |
| 2,891,435 | 6/1959 | Billeter. | |
| 2,993,311 | 7/1961 | West | 51—170.2 X |

FOREIGN PATENTS 707,445  7/1931  France.

JAMES L. JONES, JR., Primary Examiner

51—251